Aug. 27, 1957   F. A. LOESCHER   2,803,882
ELECTRICAL INTEGRATING AND REGISTERING MEANS
FOR LEATHER AREA MEASURING MACHINES
Filed Dec. 11, 1953   2 Sheets-Sheet 1

Inventor
Friedrich A. Loescher
By his Attorney

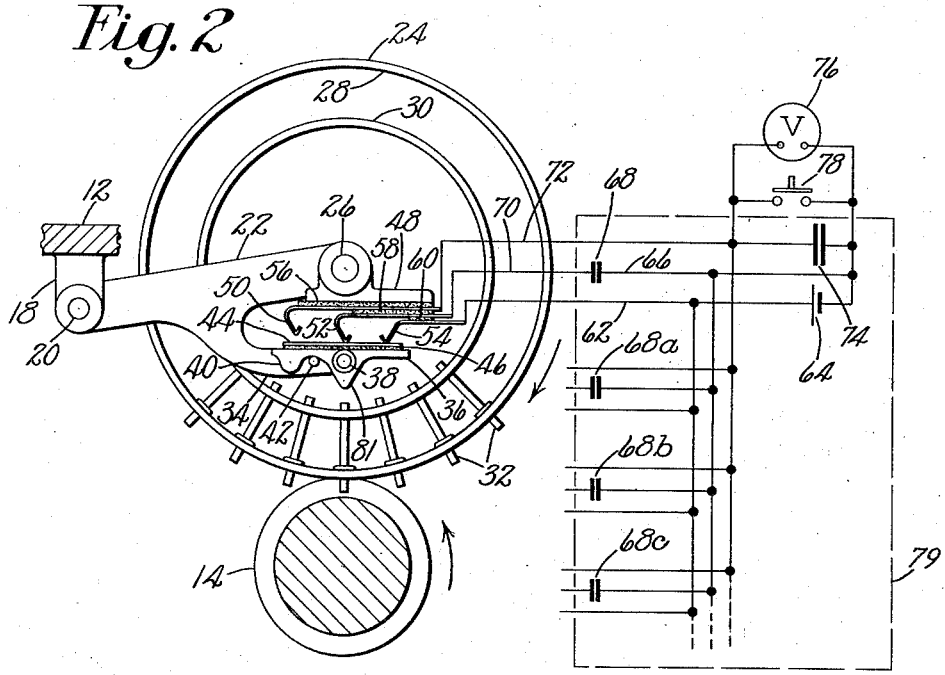
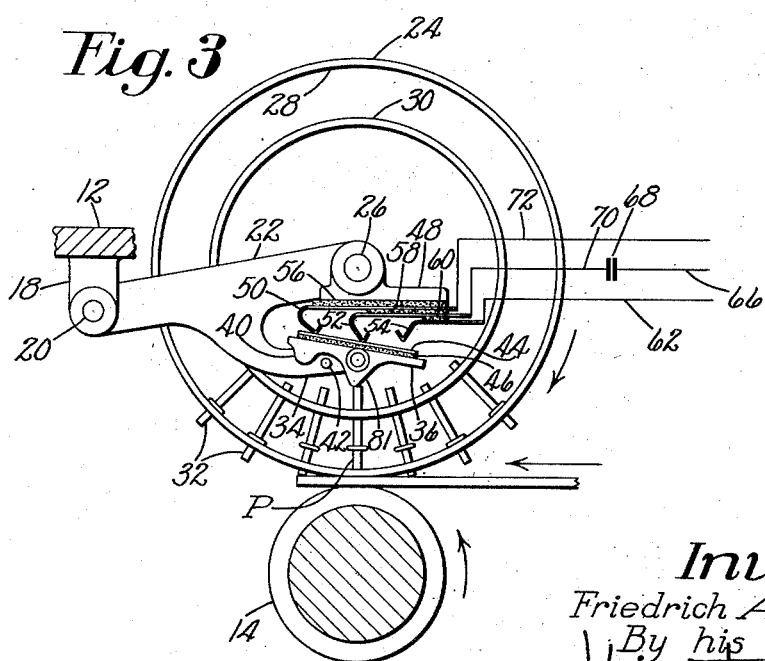

United States Patent Office 2,803,882
Patented Aug. 27, 1957

2,803,882
ELECTRICAL INTEGRATING AND REGISTERING MEANS FOR LEATHER AREA MEASURING MACHINES

Friedrich A. Loescher, Oberursel, Germany, assignor to Maschinenfabrik Turner Aktiengesellschaft, Oberursel, Germany, a corporation of Germany Application December 11, 1953, Serial No. 397,705

Claims priority, application Germany December 24, 1952

4 Claims. (Cl. 33—123)

The present invention relates to machines for measuring the superficial area of sheet material workpieces and particularly to electrical means for integrating and registering such measurement, and is herein described in association with a "pin wheel" type measuring machine which is based upon the principles disclosed in United States Patent No. 1,046,655, granted December 10, 1912, in the name of Gustav Adolf Schettler. However, it is understood that the invention in its broader aspects is not limited to use with this type of machine but is adaptable to all area measuring machines of the well-known "Sawyer" type.

When workpieces are to be measured in this type of machine, they are passed between two sets of rolls. Particularly in the measurement of leather workpieces it is necessary that the motion of the workpieces be interrupted from time to time to straighten and spread out the workpieces so that the entire superficial area will be measured. Therefore, any scheme which is based upon a theory of a constant rate of motion of the workpiece is impractical. Furthermore, since this type of machine is based upon a unitary principle it must be possible for any integrating device to register one or more unitary area measurements at the same instant.

It is an object of the present invention to provide, in association with an area measuring machine, electrical means for integrating and registering the measurement of a workpiece which permit the motion of the workpieces through such machine to be interrupted.

It is also an object of the present invention to provide electrical means for integrating and registering the measurement of a workpiece which are adapted to integrate and register more than one unitary area measurement at the same instant.

In the "pin wheel" type machine there is provided a constantly rotating grooved feed roll. Spaced across the width of the machine are a multiplicity of wheels each of which has a number of radially extending pins slidably mounted therein which normally protrude beyond the periphery of the wheel and into the grooves of the feed roll. Each wheel is freely rotatable and mounted upon an arm which in turn is pivotally mounted on a frame member. Each of these pins is representative of a unit of area as is more fully described in the above-mentioned patent.

According to the various features of the present invention there is provided on each of the supporting arms a rocking lever which is adapted to be oscillated each time a pin is displaced inwardly by the presence of a workpiece between the feed roll and its wheel. On top of the rocking lever is an electrical contact bar. Three contacting springs are adapted to complete riccuits through said bar at various times. Normally two of said contacting springs complete a circuit from a source of direct current to charge a unitary capaciter which is representative of the area represented by the displaced pin. There is a unitary condenser associated with each wheel, all of which have the same capacitance. When the rocking lever is oscillated the charging circuit is broken, the contacting spring connected to the condenser remains in contact with the contact bar and a circuit is completed to a much larger collecting condenser through the other contacting spring. Thus, it is possible to transfer several charges from unitary condensers to the collecting condenser at the same time. After the workpiece has been measured the total charge on the collecting condenser may be determined by a voltmeter and calibrated so that it indicates the area of each workpiece.

Pins are displaced only when a workpiece is interposed between the disk and the feed roll and the rocking lever is oscillated only by movement of such displaced pins. Since the disk is freely rotatable and is driven, when a workpiece is so interposed, only by the motion of the workpiece, then when that motion is interrupted, further oscillation of the lever will not occur and regardless of the position of the lever the charge of the collecting condenser will neither be increased nor decreased during such interruption. In this manner it is possible to interrupt the motion of the workpiece to straighten out any folds or wrinkles which may occur without affecting the accuracy of the measurement.

The above and other features of the invention, including various novel details of construction and combination of parts, will now be more particularly described with reference to the accompanying drawings and pointed out in the claims.

In the drawings,

Fig. 2 is a view on an enlarged scale of certain parts shown in Fig. 1 with a diagrammatic view of an electrical circuit superimposed thereon; and Fig. 3 is a view similar to Fig. 2 with the various parts shown in their operating positions.

Figure 1:
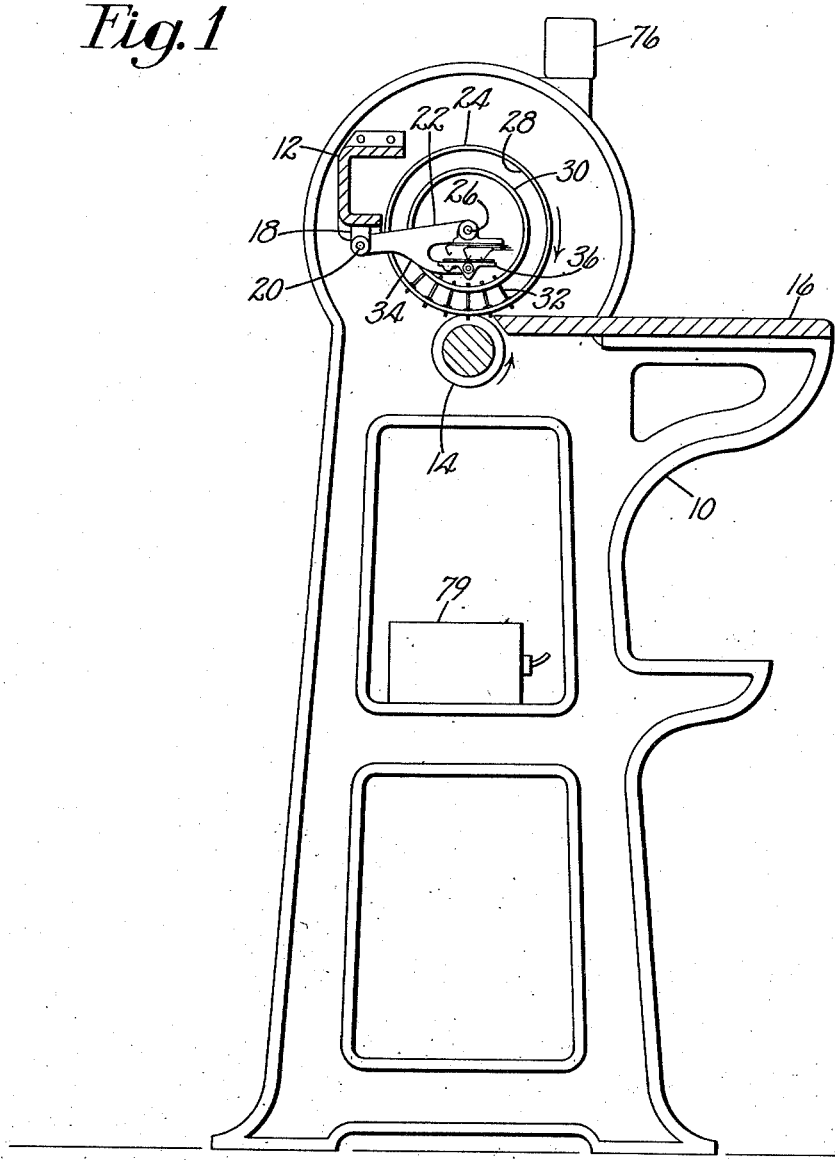
Fig. 1 is a sectional view in elevation of a machine embodying the present invention.

Referring to Fig. 1 the general outline of an area measuring machine of the type disclosed in the above-mentioned patent is shown. The upper portion of a side frame 10 has been simplified insofar as the present invention permits removal of the integrating and registering mechanism therein disclosed. The end frames (only one of which, 10, is shown) are connected by a U-shaped member 12. A grooved feed roll 14 extends between said frames and is constantly driven in the direction indicated by the arrow in a conventional manner. A feed table 16 likewise extends between the end frames and is adapted to assist in delivering workpieces to the feed roll 14. At each end of the member 12 is a lug 18 (only one of which is shown). A shaft 20 extends between the lugs 18 and pivotally connected to this shaft are a multiplicity of brackets 22. On each bracket 22 a wheel 24 is rotatably mounted at 26. Rims 28, 30 are formed on each wheel 24 and twenty-four equally spaced pins 32 are slidably mounted therein. The pins 32 protrude beyond the periphery of each wheel 24 and extend into corresponding grooves of the feed roll 14. The lateral spacing between corresponding pins 32 in each wheel 24 is a fixed, equal distance, and the circumferential spacing between each pin 32 at the periphery of each wheel 24 is likewise the same fixed distance. The wheels 24 normally ride on the lands of the feed rolls 14, being driven in the direction indicated by the arrow. When a workpiece is interposed between the feed roll 14 and the wheels 24 (Fig. 3) are raised pivotally about the shaft 20, each wheel 24 is then driven by the movement of the workpiece W and each pin 32 which is raised to its greatest extent (pin P) is indicative of the passage of one square unit of material between said wheel and feed roll. The principles of operation regarding the general method of construction of said pin wheels and the principles of their operation are fully described in the above-mentioned patent and reference is made thereto for a fuller description thereof.

In accordance with the features of the present invention an arm 34 is formed on the bracket 22 and at the end thereof a rocking lever 36 is pivotally connected at 38. A weighted portion 40 normally urges the rocking lever 36 in a counterclockwise direction (Fig. 2), movement of the lever 36 being limited by a stop pin 42 affixed to the arm 34. A contact bar 44 is attached to the upper surface of the lever 36 with a layer of insulating material 46 being interposed therebetween. A lug 48 is formed integrally with the arm 22 and three contacting springs 50, 52 and 54 are mounted thereon with insulating layers 56, 58 and 60 separating said contacting springs and said lug. The contacting spring 54 (Fig. 2) is connected to one side of a direct current supply 64 by a wire 62. The other side of the direct current supply 64 is connected by a wire 66 to a unit capacitance 68. A line 70 connects the contact 52 to the opposite side of the condenser 68; thus when the machine is in its rest position the condenser 68 is charged by the power source 64. Unit condensers, each having the same capacitance, are provided for each wheel 24 and are indicated by the reference characters 68a, 68b, 68c etc. A line 72 connects the contact spring 50 to one side of a collecting condenser 74 which is of much greater capacitance than the condensers 68. A voltmeter 76 is arranged to measure the voltage potential of the condenser 74 and a switch 78 which is normally open is adapted to discharge the condenser 74.

The wires 62, 70 and 72 from each wheel 24 are carried to a box 79 (Fig. 1) attached to the frame 10 in which are mounted the unit condensers 68, 68a 68b, etc., and the collecting condenser 74. The voltmeter 76 is mounted on the frame 10 in view of the operator for reasons which will further appear.

As can be seen from Fig. 3 when a workpiece is interposed between the feed roll 14 and the wheel 24, the pins 32, when raised to their uppermost position are adapted to contact a lug 81 and oscillate the lever 36 in a clockwise direction. As has been pointed out, the passage of a square unit of material is indicated when each pin is raised to its uppermost position. Therefore, at this point the charging circuit for the condenser 68 is broken and the circuit flowing through the contacting springs 52, 50 is completed so that the charge on the condenser 68 may be transferred to the condenser 74. It is obvious that at any one moment circuits may be completed through any number of the several contacts 52, 50 whereby the charges on the several condensers 68a, 68b, etc. might be transferred to the collecting condenser 74. The capacity of each of the condensers 68 is identical and the charge transferred by the raising of each successive pin on a wheel to the collecting condenser 74 is likewise identical for all practical purposes so that each time a charge is so transferred it is indicative or representative of a unit of area. Thus the voltmeter 76 which is conveniently mounted on the frame of the machine and in view of the operator (Fig. 1) may be calibrated so that the reading thereof indicates the total area of each workpiece measured.

When a workpiece is being measured, the wheel 24 rotates only when the workpiece is moving. Therefore, the rocking lever 36 will also only oscillate when such movement is present. Therefore, if the operator desires to interrupt the motion of the workpiece to straighten out folds or wrinkles, there will be no further transference of the charges from the various condensers 68 to the collecting condenser 64 regardless of the position of the rocking levers 36 nor will the charge on the condenser 64 be varied in any other manner.

After the workpiece is passed through the machine, the operator may note its measurement as indicated by the calibrated voltmeter 76 and thereafter discharge the charge on the condenser 74 by closing the switch 78 which may be located on the machine at any convenient place but is herein shown only in the diagrammatic view of Fig. 2.

Having thus described my invention, what I claim as new and desire to secure by Letters Patent of the United States is:

1. In a machine for measuring the superficial area of sheet material workpieces which has a multiplicity of measuring wheels extending across the width of the machine and a power driven feed roll for carrying workpieces beneath said wheels, the combination of means associated with each wheel for sensing increments of movement of said wheel when a workpiece is beneath said wheel, means for supplying substantially equal unit quantities of electricity, a collecting condenser, means for transmitting a single unit of electricity from said supplying means to said collecting condenser, said means being operative upon each sensing of an increment of movement of each of said wheels, and means for determining the total quantity of electricity in said collecting condenser whereby such determination is indicative of the total area of each measured workpiece.

2. In a machine for measuring the superficial area of sheet material workpieces which has a multiplicity of measuring wheels extending across the width of the machine and a power driven feed roll for carrying workpieces beneath said wheels, the combination of means associated with each wheel for sensing increments of movement of said wheel when a workpiece is beneath said wheel, means associated with said sensing means for supplying substantially equal unit quantities of electricity, a collecting condenser, means for transmitting a single unit of electricity from said supplying means to said collecting condenser, said means being operative upon each sensing of each increment of movement of said wheel, and means for determining the total quantity of electricity in said collecting condenser whereby such determination is indicative of the total area of each measured workpiece.

3. In a machine for measuring the superficial area of sheet material workpieces which has a multiplicity of measuring wheels extending across the width of the machine and a power driven feed roll for carrying workpieces beneath said wheels, the combination of means associated with each wheel for sensing increments of movement of said wheel when a workpiece is beneath said wheel, a unit condenser of relatively small capacitance associated with said sensing means which is normally connected to a source of direct current through said sensing means, a collecting condenser of relatively large capacitance, means for interrupting the connection of the unit condenser from the power source and for transferring the electrical charge thereon to the collecting condenser upon each sensing of movement of the measuring wheel, and a voltmeter calibrated to indicate units of area for measuring the total charge of the collecting condenser.

4. In a machine for measuring the superficial area of sheet material workpieces which has a multiplicity of measuring wheels extending across the width of the machine, each of said wheels having a number of equally spaced radially extending pins slidably mounted therein and protruding beyond the periphery of said wheels and a grooved power driven feed roll for carrying workpieces beneath said wheels, the combination of a rocking lever associated with each wheel and adapted to be oscillated by the passage of each pin which is displaced by the presence of a workpiece between said wheel and feed roll, a unit condenser of relatively small capacitance associated with said lever, means connecting said unit condenser to a supply of direct current, said means being arranged to be interrupted by the oscillation of said rocking lever, a collecting condenser, means for connecting said unit condenser to said collecting condenser when the circuit connecting the unit condenser to the current supply is interrupted by oscillation of the rocking lever, and a voltmeter arranged to measure the electrical charge delivered to the collecting condenser by the various unit condensers, said voltmeter being calibrated in such a manner that its reading is indicative of the total area of each measured workpiece.

References Cited in the file of this patent

UNITED STATES PATENTS

| | | |
|---|---|---|
| 1,046,655 | Schettler | Dec. 10, 1912 |
| 2,617,197 | Derby | Nov. 11, 1952 |
| 2,654,049 | Clark | Sept. 29, 1953 |